Figure 3:
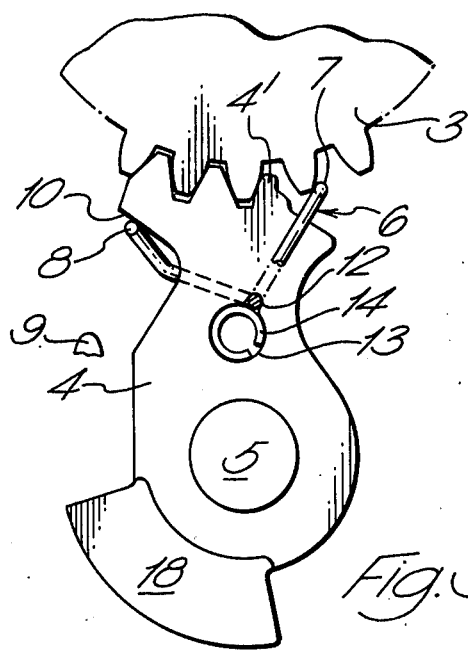

United States Patent [19]

Slipper

[11] 4,029,267
[45] June 14, 1977

[54] LOCKING SAFETY BELT REELS

[75] Inventor: John Richard Slipper, Chichester, England

[73] Assignee: Wingard Limited, England

[22] Filed: Dec. 23, 1975

[21] Appl. No.: 643,650

[30] Foreign Application Priority Data

Jan. 9, 1975 United Kingdom ............... 973/75

[52] U.S. Cl. .................. 242/107.4 A; 74/577 R; 74/577 M; 188/82.7
[51] Int. Cl.² .................. B65H 75/48; A62B 35/02
[58] Field of Search ............. 242/107.4 R–107.4 E, 242/107.6–107.7; 74/577 R, 577 S, 577 SF, 577 M; 188/82.7, 82.74, 82.77; 297/386, 388; 280/744–747

[56] References Cited

UNITED STATES PATENTS

| | | | |
|---|---|---|---|
| 3,552,676 | 1/1971 | Weber | 242/107.4 A |
| 3,770,224 | 1/1973 | Hayashi et al. | 242/107.4 A |
| 3,836,171 | 9/1974 | Hayashi et al. | 242/107.4 R |
| 3,944,162 | 3/1976 | Henderson | 242/107.4 A |

Primary Examiner—Stanley N. Gilreath
Assistant Examiner—John M. Jillions
Attorney, Agent, or Firm—Diller, Brown, Ramik & Wight

[57] ABSTRACT

An improvement in a safety belt reel in which a pawl is moved when a predetermined acceleration is exceeded to lockably engage a toothed wheel. The improvement includes a flexible member which is moved when the predetermined acceleration is exceeded so as initially to engage a tooth on said toothed wheel before said pawl causes locking of the reel. The flexible member is movable relative to the pawl whereby any impact between said member and said tooth is absorbed without causing a reaction on an acceleration responsive actuator such as a ball and saucer, or suspended mass, so that the pawl is subsequently urged into correctly phased engagement with the toothed wheel to lock the reel.

13 Claims, 7 Drawing Figures

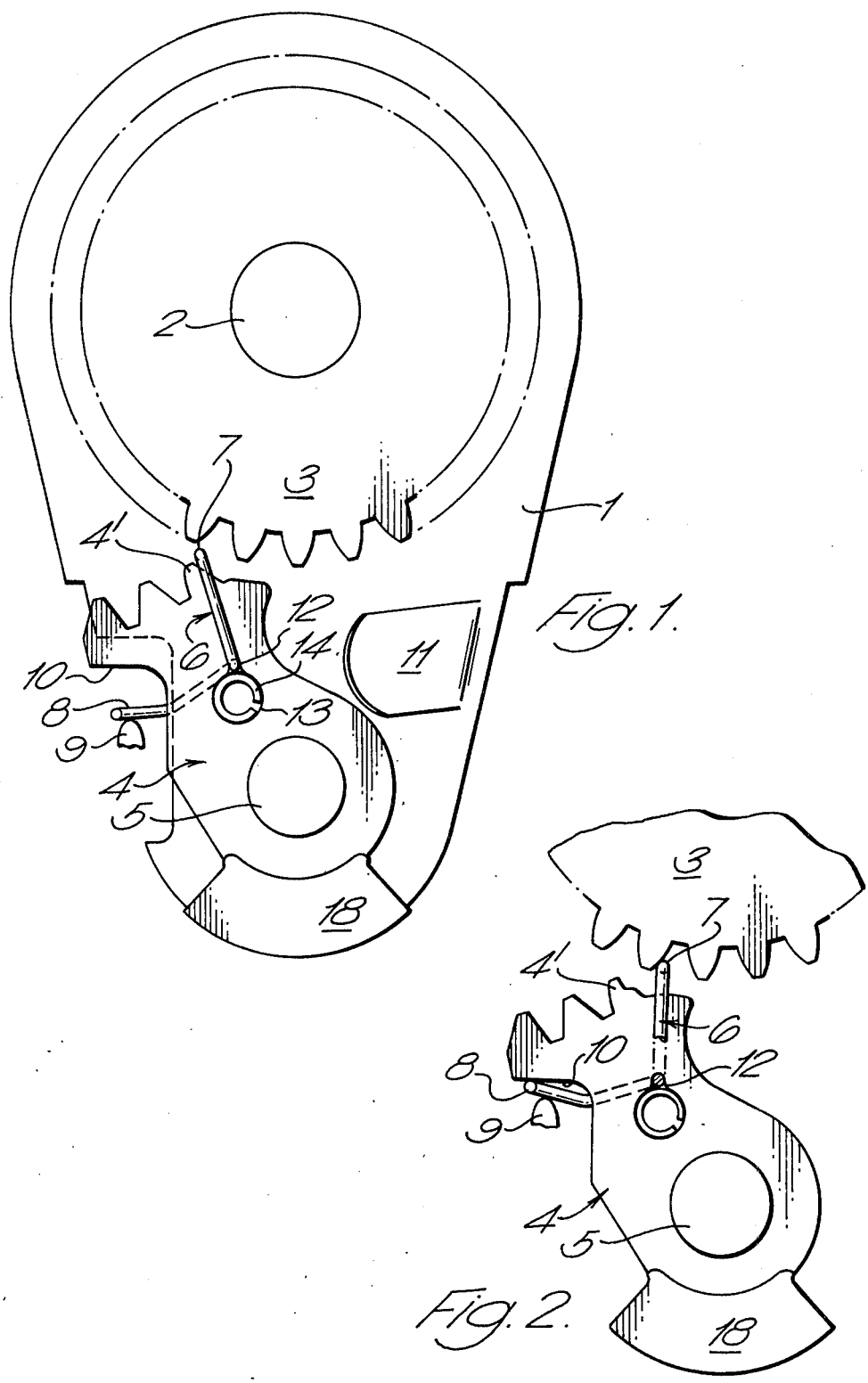

LOCKING SAFETY BELT REELS

This invention relates to improvements in a locking safety belt reel having a movable pawl for locking toothed means which is drivably coupled to the reel.

In such a reel, it is known to provide acceleration responsive means acting directly on the pawl to urge it into contact with a toothed wheel whereby rotation of the reel is prevented. Movement of the pawl is limited by a stop or by a configuration of the pawl itself which is such as to jam against the toothed wheel. Such arrangements are unsatisfactory in the following respects:

a. Because the loads on the pawl can be very great during operation, it has to be of substantial construction and must have a bearing of considerable diameter. These features mean that its inertia and the friction to be overcome to move it, can be substantial. Consequently if the force exerted by the acceleration responsive means is small, the lower threshold at which the device operates can be unpredictable. When the seat belt reel must lock in response to a vehicle deceleration as low as 0.4g as required by certain regulations, it is difficult to meet this requirement consistently.

b. When the pawl is urged into engagement with the toothed wheel which has normally already started to rotate rapidly, there is a tendency for the pawl to strike the tip of a wheel tooth and to bounce out of engagement. Surprisingly, bouncing can also occur when the pawl enters the space between the wheel teeth. High speed film has shown that several bounces can occur before satisfactory engagement is achieved. Clearly this is unacceptable.

c. When the pawl bounces out of engagement it tends to move its actuator back to the "zero g" condition. For example, where the actuator comprises a ball and saucer mechanism as disclosed in U.K. Pat. No. 1,012,946, the ball is pushed back towards its lowest point in the saucer.

d. The pawl cannot make another attempt at engagement until it is again actuated by the acceleration responsive means (for example, the ball and saucer or a suspended mass). This further actuation takes quite a long time, and when the actuator makes a second attempt, the toothed wheel is moving much more rapidly than on the first attempt and successful engagement is even less likely. A third attempt will almost certainly fail.

The present invention seeks to overcome these problems by providing a light, resilient member which can be accelerated more rapidly by the acceleration responsive means than the usual pawl, which rapid movement enables the resilient member to be inserted rapidly through the critical peripheral zone of the wheel so that a 'first time' engagement is normally achieved. Moreover, if the light resilient member bounces out of engagement, it flexes so that the tendency of the actuator to be forced back to "zero g" condition is much reduced. Said member may also vibrate rapidly after bouncing so that second and subsequent attempts at engagement are made without the delays caused by waiting for a second actuation.

In its broadest aspect, the present invention provides an improvement in a safety belt reel having a pawl movable in response to acceleration responsive means when a predetermined acceleration is exceeded and toothed means which is drivably coupled to the reel, the improvement comprising a flexible member which is movable by said acceleration responsive means to engage a tooth on said toothed means before said pawl locks said toothed means, said flexible member being movable relative to said pawl whereby any impact between said member and said tooth is absorbed without causing a reaction on said acceleration responsive means which exceeds the force exerted thereon at and above said predetermined acceleration, whereby said pawl is urged into correctly phased engagement with said toothed means to lock said reel.

The acceleration responsive means responds at least to vehicle deceleration but the term "acceleration", as used herein, covers any acceleration which is caused, in use, by motion of a vehicle in which a safety belt reel, having the improvement according to the invention, is fitted. For example, the acceleration responsive means may be a suspended mass which is accelerated, because of its inertia, when the vehicle decelerates. However, it is preferably a ball and saucer device, such as that described in U.K. Pat. No. 1,012,946 which responds to forward acceleration, deceleration and cornering of the vehicle in which it is mounted.

According to one embodiment of the invention, said flexible member is loosely connected to said pawl whereby it moves independently of said pawl initially to engage said toothed means. Preferably, said flexible member is pivotally attached to said pawl and it is provided with a portion which abuts said pawl following a predetermined lost motion.

According to another embodiment of the invention, said flexible member is elongate and has one end fixed to said pawl and the other end freely projecting therefrom. In this case, said flexible member is movable relative to said pawl by flexure. Preferably, the freely projecting end portion of said flexible member extends through an aperture in said pawl whereby the pawl is held captive for causing locking engagement with said toothed means.

Figure 4:
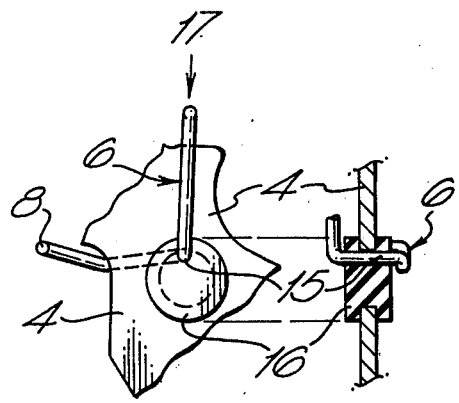

Embodiments of the invention will now be described with reference to the accompanying drawings, in which:

FIG. 1 shows an elevational view of a locking mechanism for a safety belt reel in accordance with a first embodiment of the invention, FIGS. 2 and 3 illustrate the locking mechanism of FIG. 1 at different stages during its operation, FIG. 4 illustrates a modification of the mechanism shown in FIG. 1, and FIGS. 5, 6 and 7 are elevational views of a locking mechanism for a safety belt reel according to a second embodiment of the invention and respectively show different stages in its operation.

In the locking mechanism shown in FIG. 1, a backing plate 1 supports a shaft 2 which either stores a safety belt or is drivably coupled to a belt storage reel. A toothed wheel 3 is fast with shaft 2.

Backing plate 1 also supports a shaft 5 on which a pawl 4 is pivotally mounted. Pawl 4 carries a light flexible wire member 6 which is pivotable in the plane of movement of the pawl. The wire member projects beyond the toothed edge of the pawl and is bent over at 7 so as to act as an additional but movable tooth. The other end 8 of member 6 is disposed between an actuating member 9 and the rear surface 10 of the pawl 4. Member 9 is driven by, or is part of acceleration responsive means (for example, the push rod 30 of the ball and saucer mechanism shown in FIGS. 5–7).

The backing plate 1 includes a pressed-out portion 11 which acts as a stop for the pawl 4. The first tooth 4' of the pawl 4 is of involute form, but the other teeth are arranged either lockably to engage the toothed wheel 3, or the pawl 4 is arranged to abut a stop 11 to prevent further rotation of the safety belt reel. These teeth are preferably arranged on a pitch circle which is not centered on the rotational axis of shaft 5.

A sequence of operation is depicted by FIGS. 1–3. For example, FIG. 1 shows the locking mechanism in its normal position wherein the pawl 4 and member 6 are disengaged from the toothed wheel. FIG. 2 shows the member 6 in a position after an initial movement independent of the pawl; member 6 having been moved into engagement with a tooth of wheel 3 by the actuating member 9. Due to its small diameter, low inertia and resilience, the wire member 6 engages easily in the intertooth spaces of wheel 3 even if it initially strikes a tooth tip. The member 6 pivots about a point corresponding with a recess 12 in the pawl 4 during its initial movement.

Once member 6 engages the toothed wheel 3, further rotation of the wheel 3 causes the member 6 to rotate about recess 12 until the end of portion 8 abuts the rear surface 10 of pawl 4. At this point, member 6 acts as a rigid pawl tooth and its subsequent movement is coupled to pawl 4 which is thereby urged into engagement with wheel 3. Member 6 is proportioned such that, at the point where engagement with rear surface 10 occurs, the wire "tooth" is correctly located with respect to the teeth on pawl 4 so that these teeth are correctly aligned or phased for "first-time engagement" with the teeth of wheel 3. This can be seen in FIG. 3.

The light weight (i.e. the inertia of member 6 is much less than that of the pawl 4) and small bering diameter of the wire member 6 ensure that it operates consistently when the operating force on actuating member 9 is low, for example, at a low value of vehicle deceleration.

The recess 12, in which the wire member 6 is pivotally mounted, is located in the periphery of a larger hole 13. Member 6 is retained by a roll pin 14 which is located within hole 13 but any other suitable form of mounting could be used. For example, FIG. 4 illustrates a modification wherein a shaft portion 14 of member 6 is located in a resilient grommet 16, such as a rubber grommet. The resilient grommet assists in absorbing an impact between the peak of a tooth on wheel 3 and portion 7 of member 6 causing a force to be exerted generally in the direction of arrow 17.

The pawl 4 carries to bob weight 18 at its lower end whereby the pawl is normally maintained in a disengaged position with respect to the wheel 3. Weight 18 causes the pawl 4 to be disengaged from the wheel 3 when the force on actuating member 9 is removed.

Figure 5:
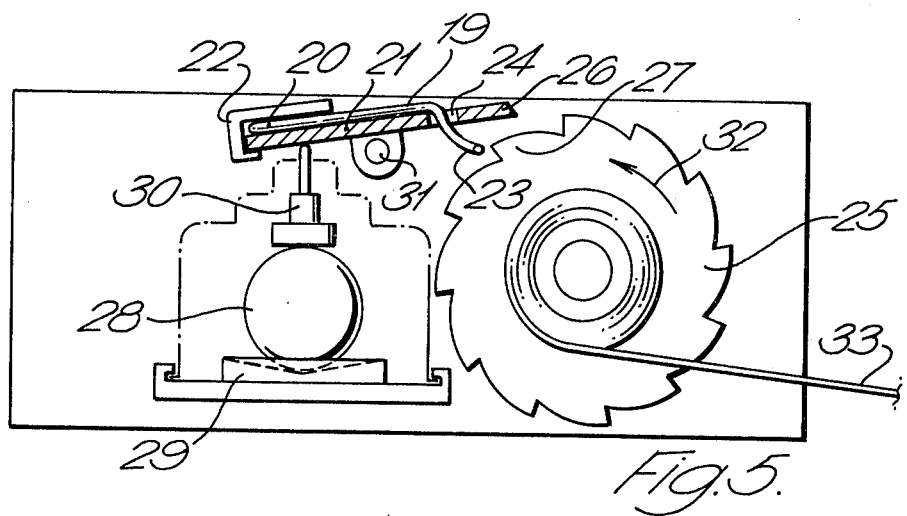
Figure 6:
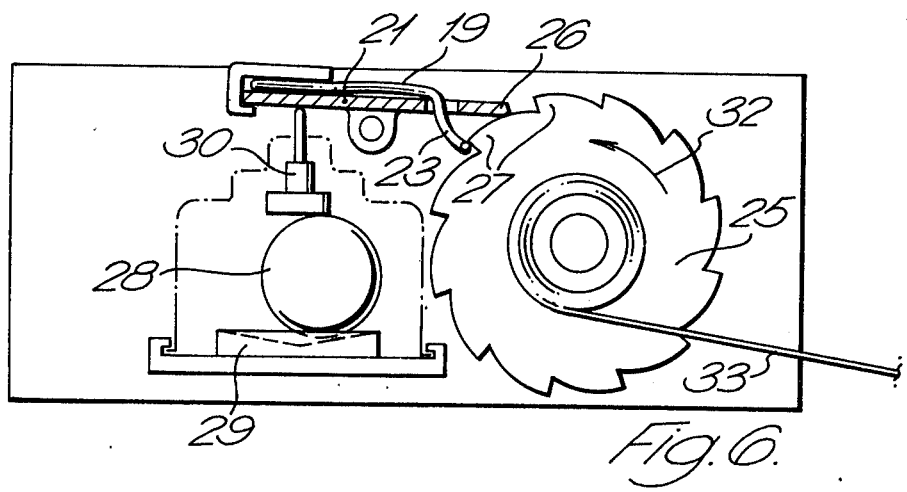
Figure 7:
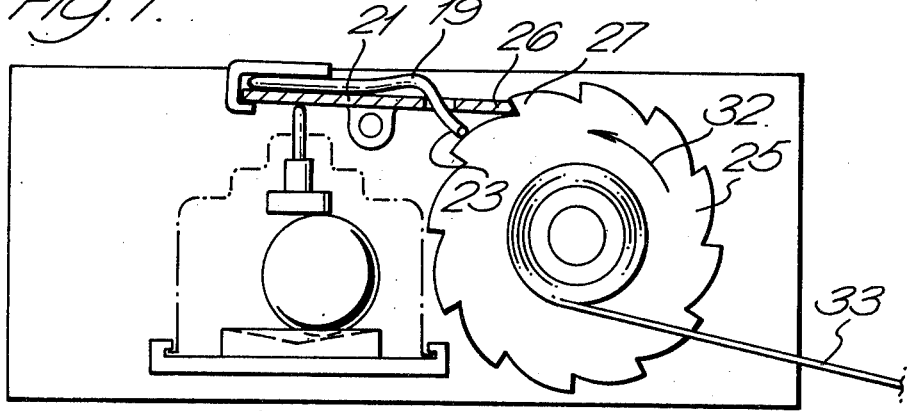

In the locking mechanism shown in FIGS. 5, 6 and 7 a flexible, elongate member 19 has one end 20 fixed to a pivotal pawl 21 by a clip 22. Clip 22 is not necessary if, for example, the end 20 is riveted or welded to pawl 21. The other end 23 of member 19 extends through an aperture 24 in pawl 21 and projects towards a toothed wheel 25. An adjacent end 26 of pawl 21 also projects towards the toothed wheel 25 and is chamfered to abut any of the leading edges of any tooth 27.

The pawl 21 is moved by acceleration responsive means comprising a ball 28 resting on a dished saucer 29 and supporting a slidable push rod 30. When, for example, the vehicle decelerates, the ball rides up the sloping wall of the saucer 29, urging the push rod 30 upwardly thereby titlting pawl 21 about its pivot 31. This state is shown in FIG. 6. The respective leading ends of 23, 26 of member 19 and pawl 21 are positioned such that end 23 initially engages the front edge of a tooth 27 whereby it maintains engagement between end 26 and the back edge of the same tooth.

As the wheel 25 rotates, the end 23 "clicks" over the tooth 27 enabling pawl 21 to engage the front of the next tooth 27 to lock the reel. This state is shown in FIG. 7.

The wheel 25 rotates in the direction of arrow 32 when a safety belt 33 is pulled.

In the above preferred embodiments, the flexible members 6 and 19 can be made of, for example, 0.040 inch diameter spring steel wire.

What we claim is:

1. An improvement in a mechanically operable safety belt retractor, of the type comprising a belt storage reel, means biasing said reel in a belt retraction direction, toothed means mounted for rotation with said storage reel, a pawl, means mounting said pawl for movement from an inoperative first position to an operative second position engaging said toothed means for locking said reel, and an inertia responsive mass for moving said pawl from said first position to said second position when a predetermined minimum acceleration is exceeded, the improvement comprising a flexible member connected to said pawl and supported thereby for movement in the direction of motion of said pawl, said flexible member being:
   a. directly engageable with said mass for causing engagement of said flexible member with said toothed means,
   b. spaced from said pawl by a predetermined distance to ensure correct phased engagement between said pawl and said toothed means, and
   c. flexurally movable relative to said pawl to absorb the impact between any tooth of said toothed means and said flexible member whereby a reaction is avoided on said mass due to engagement between said flexible member and said toothed means when rotating, said pawl being subsequently urged into correct phased engagement with said toothed means for locking said reel.

2. The improvement according to claim 1 wherein said flexible member is loosely connected to said pawl to enable movement, independently of said pawl, initially to engage said toothed means.

3. The improvement according to claim 2 wherein said flexible member has a pivotal portion pivotally attached to said pawl, and said flexible member is provided with portion spaced from said pivotal portion which abuts said pawl following a predetermined lost motion.

4. The improvement according to claim 3 wherein the pivotal portion of said flexible member is resiliently supported.

5. The improvement according to claim 1 wherein said pawl is counter weighted to cause it to return to said first position in a rest condition, wherein said toothed means is free to move.

6. The improvement according to claim 1 wherein said inertia responsive mass comprises a ball, a push rod in contact with said ball, a support having an inclined recess, the ball riding on the inclined recess in said support, to move the push rod, when the ball is accelerated.

7. The improvement of claim 2 wherein said flexible member has first and second remote ends and an intermediate pivotal portion, said pivotal portion being received in said pawl for limited pivoting of said flexible member relative to said pawl, said first end being engageable with said tooth means for effecting movement of said pawl by said tooth means, and said second end being initially spaced from said pawl and movable into engagement with said pawl after a lost motion movement to limit further movement of said first end relative to said pawl to resiliently opposed movement.

8. The improvement of claim 2 wherein said flexible member has first and second remote ends and an intermediate pivotal portion, said pawl having a first bore therethrough and a second and smaller bore immediately adjacent to and in communication with said first bore, said pivotal portion being received in said second bore for pivoting of said flexible member relative to said pawl, and a plug received in said first bore.

9. The improvement of claim 8, wherein said plug is a resilient plug.

10. A safety belt retractor comprising a safety belt storage reel, means biasing said reel in a belt retraction direction, a ratchet wheel mounted for rotation with said reel, a toothed pawl movable between a first position to a second position for engaging said ratchet wheel for locking said reel against further rotation, means for returning said pawl to said first position in a condition of rest, inertia means including a mass responsive to at least a predetermined minimum acceleration to cause said locking, a flexible member pivotally mounted on said pawl, said flexible member having a first portion extending towards said ratchet wheel for engagement therewith and a second portion directly engageable with said inertia means, said inertia means being operable to pivot said flexible member relative to said pawl for causing said first portion to engage said ratchet wheel, said first portion being spaced by a predetermined distance from the teeth on said pawl to cause phased engagement between the teeth on said pawl and the teeth on said ratchet wheel, said flexible member being provided to absorb the initial impact between it and said ratchet wheel when said inertia means responds to said acceleration whereby a reaction on said inertia means is avoided and the teeth on said pawl are brought into correctly phased engagement with the teeth on said ratchet wheel.

11. A safety belt retractor comprising a safety belt storage reel, means biasing said reel in a belt retraction direction a ratchet wheel mounted for rotation with said reel, a pawl movable between a first position to a second position for locking said reel, said pawl having a tip for engaging said ratchet wheel to cause said locking, means for returning said pawl to said first position in a condition of rest, inertia means including a mass in engagement with said pawl, said mass being responsive to at least a predetermined minimum acceleration to move said pawl from said first position towards said second position, a flexible member supported by said pawl and having a free end extending at an angle therefrom for engaging said ratchet wheel in advance of said pawl to absorb the initial impact therewith, the free end of said flexible member being spaced from the tip of said pawl to ensure correctly phased engagement between said tip and the teeth on said ratchet wheel.

12. The improvement according to claim 11 wherein said flexible member is elongate and has one end fixed to said pawl and the other end free by projecting therefrom, said flexible member being movable relative to said pawl by flexure.

13. The improvement according to claim 12 wherein the freely projecting end portion of said flexible member extends through an aperture in said pawl whereby said pawl is held captive for causing locking engagement with said toothed means.

* * * * *